Patented Nov. 4, 1930

1,780,657

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

PROCESS OF TREATING RUBBER AND PRODUCT PRODUCED THEREBY

No Drawing. Application filed August 23, 1922. Serial No. 583,903.

This invention has for its object the dispersion of crude rubber or other kindred coagulated materials such as balata, gutta percha or the like, in an aqueous vehicle, and the utilization of the product thus obtained in various arts.

Unvulcanized crude rubber, i. e. the coagulated rubber globules which were originally separate in the latex of the rubber tree, such as *Hevea brasiliensis*, as is generally now accepted, consists of a mass of adhering compacted rubber globules, each globule itself comprising a terpene center and an envelope or protective membrane of a colloid of the nature of a protein. These protective envelopes or membranes are themselves hydrophilic, being capable of water absorption. The terpene center of the globule, which consists of a large number of polymerized molecules, generally accepted to be chemically expressed as $(C_5H_8)_n$, is capable of absorbing an organic solvent of the nature of benzol. The theory underlying the present invention is that, if the facial tension of the individual globules of a mass of crude rubber can be increased as by swelling or enlargement and the interfacial tension or area of contact of globule to globule can be diminished to a point where the globules are substantially freed from one another and water can be introduced into the interglobular spaces, the mass of crude rubber may thus be separated into its constituent globules and the globules thus dispersed in an aqueous water medium. If this theory is correct, it is possible thus to effect the separation and dispersion of the rubber globules of a mass of crude rubber without affecting in any material or substantial degree the physical or chemical characteristics of the rubber globules so that the dispersed rubber may be employed for all purposes for which the original crude rubber mass could have been employed. I have succeeded in effecting a dispersion of crude rubber in water in a manner which I have hereinafter described in detail.

The invention consists, not only in the process by which this is accomplished, but also in the product itself. By the process which I have hereinafter decribed, I produce what I may term an aqueous dispersion of a previously coagulated latex in non-coagulated colloidal form,—i. e. a body of water in which crude rubber is dispersed in colloidal form, the water constituting the continuous phase and the globules of rubber the disperse phase. This product partakes of some of the characteristics, not only of an emulsion but of a true colloidal solution. The product, moreover, is one which may be diluted to any extent with water, so that, for example, it may with advantage be mixed with fibrous stock of any character in a beating engine or other equivalent device so as to be precipitated upon the fibers of the stock prior to the formation of a sheet or mass of the fibrous material or otherwise used in the arts. Thus the aqueous dispersion may be mixed with fibrous materials in preparing them for the formation of webs or sheets of paper or other felted material. Such product may likewise be employed for coating or impregnating such fibrous materials as yarns, threads, cords or ropes, or fabrics whether knitted, braided or woven.

For the purpose of increasing the facial tension of the individual rubber globules of a mass of crude rubber and of reducing the interfacial tension of the globules, I first cause a swelling of the globules followed by the introduction of a sufficient amount of water into the mass, and thus into the interglobular spaces, to finally effect the separation and dispersion of the globules in the continuous water phase. As hereinafter described, one way in which this may be accomplished is by "dissolving" the mass of crude rubber in an organic solvent of the nature, for example, of benzol. In producing this rubber benzol "solution" the surface area of the individual rubber globules is increased approximately four times, thereby causing with the swelling of the individual globules a great reduction in the interfacial tension of the globules. Then, by substituting water for the benzol (i. e. the introduction of water and the removal of the benzol), the rubber globules in separated form are now left dispersed in the water. With the removal of the benzol there is a tendency towards the contraction of the individual globules, but on the other hand with the substitution of water for the benzol the water tends to effect a swelling of the protective films or membranes of the individual globules,—possibly by replacement of water for the benzol in the membranes, but in any event in the final dispersed product the individual particles or globules are of the same order of magnitude as the original globules of rubber in the latex from which the original mass of crude rubber was derived. It is my theory that the benzol penetrates the protective membrane or coating of the individual globule to the terpene center, and that the center swells without disruption of the membrane. With the substitution, however, of water for the benzol with the attendant removal of the benzol, the membrane or protective coating is swollen by the water inasmuch as it is hydrophilic. In either case the facial tension of the globule is increased and the interfacial tension diminished to zero. As subsequently pointed out I may employ a colloid either as a stabilizing agent for the dispersion or as an agent which contributes to the dispersion of the rubber mass as well as the stabilization of the dispersed product. I take it that the function of the colloid is to afford an additional protective film or coating for the dispersed particles or globules of the rubber.

According to one method of practicing my invention, the crude material, e. g. the raw coagulated product or coagulum obtained from the latex of *Hevea brasiliensis*, is first dissolved in a solvent to form a colloidal solution and is then mixed with water, after which the mixture is subjected to vacuum distillation at a relatively low temperature to distill off the solvent and leave the rubber dispersed in the water. As illustrative of one way of practicing my invention, I cite the following example: To 85 parts by weight of benzol there is added, say, 15 to 20 parts by weight of crude rubber to form a benzol-rubber solution. To this I add 5% to 10% by weight of 26% aqua ammonia. Preferably this latter step is accomplished in a closed vessel with sufficient agitation until the ammonia is absorbed in the mass. The resultant product is a physically homogeneous mixture. To this mass is now added water equivalent in amount to the benzol with sufficient agitation to secure a practically physically homogeneous mixture. This mass is now subjected to vacuum distillation at a relatively low temperature. Preferably the operation should take place with a vacuum as low as 18 to 28 inches in mercury and with a correspondingly low temperature for the distillation of the benzol without causing the coagulation of the rubber. The product is, as I have previously stated, one in which the rubber in finely divided colloidal particles is dispersed uniformly throughout the aqueous phase without apparent coagulation.

As a result of the foregoing operation there is no apparent "depolymerization" and/or breaking down of the physical structure of the dispersed rubber globules, and no apparent chemical change in the rubber globules from the original rubber mass of which the dispersed product was produced. Consequently, upon the removal of the water, the coagulated rubber mass may be employed for all purposes, in the same manner, for which the original rubber mass could be employed.

In the distillation of the benzol, due to the agitation of the mass, there is a tendency for some of the minute colloidal particles to coagulate and to become sticky under the temperature necessary for the distillation of the benzol. To prevent this, I find it desirable in ordinary commercial operation to add to the mass prior to the step of distillation a small quantity of a colloid such as a saponified product (e. g. a soap), a soluble oil such as a sulphonated oil, or a small quantity of albumin, or any two or all three of them. For example, I may add to the mass, say, 2% of sulphonated castor oil, or water-soluble pine oil, or a resin soap, or blood albumin, or a combination of any two or more of these components. I find that the addition of these substances to the mass has the effect of forming protective coatings for the globules of rubber and of preventing coagulation of the rubber globules during the distillation of the benzol and results in a product in which there is less tendency for the particles of rubber to coagulate when kept for any length of time.

Sometimes, instead of adding the quantity of ammonia which I previously cited, I employ a smaller quantity, and, after the final aqueous dispersion is produced, I add a small quantity of ammonia to the product for the purpose of preventing coagulation. Ordinarily, however, this is not necessary as a sufficient amount of ammonia may be left even after distillation in the final product. In the commercial operation and as a matter of economy, it is not necessary that the entire amount of benzol should be distilled off, as the presence of a certain minute amount of benzol in the final product has no detrimental action when the product is eventuallly used for certain purposes. Hence, when I refer to the distillation or removal of the solvent, I do not mean that the entire amount of the solvent is necessarily distilled off or removed until the last traces are removed.

Of course, it will be understood that, in lieu of crude rubber, such as given in the specification for example, I may substitute therefor any one of the crude coagulated products of a colloidal nature such as obtained from the latices of plants more or less akin to the Hevea, such as produced from other types of rubber-bearing latices. I may also use other products such as balata, gutta percha or the like; and, in the claims hereinafter appended, it will be understood that, in using the term "rubber", I mean to include such coagulated products. Likewise any other suitable solvent may be employed instead of benzol, such for example as toluol, xylol or other rubber solvents, although as a practical matter it is desirable to use an inexpensive solvent of low boiling point which may be distilled off so as to leave the rubber dispersed in the aqueous vehicle without coagulation or depolymerization.

The ultimate product or aqueous dispersion may be added directly to the fibrous materials, such as cellulose or wood pulp, in a beater engine, and the rubber precipitated on the fibers either with or without the use of a precipitating or coagulating agent. If the beater contents are heated, the rubber may be caused to coagulate and to adhere to the fibers without the addition of the precipitating or coagulating agent. In fact, the action of beating the stock has the effect of causing the colloidal particles of rubber to adhere to the fibers of the mass. If a precipitating agent be desired, one may use acetic acid, alum, or any other material used for coagulating rubber.

It is quite apparent that the quantity of rubbber in dispersion added to the paper pulp will depend upon the quantity of the paper to be produced and the nature of the fibers or other materials used in the manufacture of the paper. The addition of the dispersion may be accomplished after the pulp has been beaten to the desired degree, after which the beater roll may be lifted and rotated merely for the purpose of securing a homogeneous admixture of the aqueous dispersion and the fibrous material so as to secure the even distribution of the rubber throughout the mass. In the event that a precipitating or coagulating agent is used, it may be added after the pulp has been beaten or mixed to the desired extent. It is possible to determine with exactness the quantity of the aqueous dispersion to be added according to the weight of the fiber, since the proportion of the rubber to the water in the aqueous dispersion is known, and that amount of the dispersion may be added according to the requirements of the particular paper to be produced. (While I speak of "aqueous rubber dispersion", of course it will be understood that I mean to include dispersions of balata, gutta percha or the like.)

My aqueous rubber dispersion lends itself to the incorporation of other materials therein. For example, I may dissolve in the rubber-benzol solution sufficient sulphur for efficient vulcanization of the rubber in the subsequent use of the aqueous rubber dispersion. In addition, I may also dissolve in the solvent the so-called vulcanization "accelerators" that are water-soluble, such for example as formin (hexamethylenamine). In the manufacture of a product which it may be desired subsequently to vulcanize, one may proceed as follows: A rubber benzol solution may be prepared by dissolving 1,800 parts by weight of rubber in 10,000 parts by weight of benzol. Into this solution is dissolved 100 parts by weight of sulphur. I now add about 50 parts by weight of 26° aqua ammonia, and, after this has been thoroughly incorporated in the rubber-benzol solution as previously described, I then add 10,000 parts by weight of water in which is dissolved 36 parts by weight of sulphonated castor oil. In this case the sulphonated castor oil acts as a dispersing agent as well as a stabilizing agent. After thorough stirring and until the rubber-benzol solution is emulsified in the water, the benzol is distilled off in a vacuum still, with agitation, and in the aqueous dispersion thus produced I dissolve 1 part by weight of formin. This dispersion may now be added in the desired proportion to paper pulp in the beating engine or it may be thoroughly mixed with the pulpy mass after it has been beaten to the desired extent. The pulp is then formed into a web or sheet on a paper-making machine in the usual manner, the colloidal particles or globules of rubber having been coagulated or caused to adhere to the fibers with or without the use of a suitable agent. After the sheet is dried, it may be subjected to a temperature suitable for the vulcanization of rubber, whereupon the rubber is vulcanized in situ in the fibrous sheet.

It is not necessary for the vulcanization of the sheet that the sulphur should be initially added to the rubber solution, as the finished fiber rubber sheet may be subjected to the cold vulcanization process known as the Peachey process and described in British Letters Patent No. 129,826 to Stanley J. Peachey.

It is, of course, evident that if desired I may add to the aqueous dispersion any suitable pigments such as fillers or coloring matters which will be held in suspension and adhere to the rubber.

One may select any particular crude rubber with accurate knowledge as to its characteristics; he may determine with exactness the proportion of rubber to be employed in the dispersion; and, by following the processes herein described, one is able to employ with the rubber dispersed in the water such vulcanizing and compounding agents as he is familiar with and as may be desirable in the arts.

I have herein referred to the use of ammonia (meaning to include ammonia compounds and also the amines which may function as ammonia in the process as herein described), and now call attention to the important function of this material. So far as I am aware, I am the first to discover that ammonia is apparently adsorbed by the colloidal rubber particles, serves to render them more or less water-soluble, and permits the easy separation of the volatile solvent from the aqueous mixture.

Having thus explained the nature of my invention and described ways in which the process may be practiced and the product produced and utilized, without attempting to set forth all of the ways in which the invention may be practiced or the product produced and used, what I claim is:—

1. A process of dispersing a rubber mass in water, which comprises dissolving the rubber in a solvent, mixing water and a colloidal dispersing agent into the solution, and then removing the solvent, thereby producing a dispersion of the original rubber in water which is capable of recoagulation on removal of the water.

2. A process of dispersing a rubber mass in water, which comprises dissolving the rubber together with ammonia in a solvent, mixing water with the solution, and removing the solvent.

3. A process of dispersing a rubber mass in water, which comprises dissolving the same in a solvent, mixing water with the solution, and removing the solvent by vacuum distillation at a low temperature.

4. A process of dispersing a rubber mass in water, which comprises dissolving the same in a solvent together with a dispersing agent, mixing water with the solution, and removing the solvent by vacuum distillation at a low temperature.

5. A process of dispersing a rubber mass in water, which comprises dissolving the rubber in a solvent, mixing water into the solution together with an agent which acts as a coagulation preventative, and then removing the solvent.

6. A process of dispersing a rubber mass in water, which comprises dissolving the rubber in a solvent together with ammonia, mixing water with the solution, adding an agent to prevent the coagulation of the rubber, and removing the solvent.

7. A process of dispersing a rubber mass in water, which comprises dissolving the rubber and sulphur in a solvent, mixing water and a colloidal dispersing agent into the solution, and removing the solvent without coagulating the colloidal rubber.

8. A process of dispersing a rubber mass in water, which comprises dissolving rubber and sulphur in a solvent, mixing water and an "accelerator" into the solution, and removing the solvent.

9. A process of dispersing a rubber mass, which comprises dissolving the rubber in a solvent together with ammonia, and mixing water with the solution, and removing the solvent.

10. A process of dispersing a rubber mass in water, which comprises dissolving the rubber and sulphur in a solvent, and mixing water and a water-soluble oil into the solution, and removing the solvent.

11. A process of dispersing a rubber mass in water, which comprises dissolving the rubber and sulphur in a solvent, mixing water and a water-soluble oil with the solution, and removing the solvent by vacuum distillation.

12. A process of dispersing a rubber mass in water, which comprises dissolving the rubber and sulphur in a solvent, and mixing water and a saponification product into the solution, and removing the solvent.

13. A process of dispersing a rubber mass in water, which comprises dissolving the rubber and sulphur in a solvent, mixing water and a saponification product with the solution, and removing the solvent by vacuum distillation.

14. The herein described process which comprises dissolving rubber and sulphur in a solvent together with ammonia, mixing therewith water and a pigment, and removing the solvent from the mixture leaving rubber, sulphur and pigment in homogeneous dispersion throughout the water.

15. A process of dispersing in water a coagulated mass of globules, of the nature of crude rubber, which comprises swelling with a liquid organic agent the globules of the mass and incorporating a colloid in the mass, introducing water into the mass in sufficient amount to constitute it the liquid continous phase of the dispersion while preserving the physical and chemical characteristics of the mass prior to dispersion, and removing said liquid organic agent.

16. A new product, comprising substantially only water as the liquid vehicle having dispersed therein in colloidal non-coagulated form the coagulum of a latex together with a hydrophilic colloid, sulphur and a pigment, and which on removal of water is vulcanizable as a mass, the major portion of said dispersed particles being substantially uniform in size and of the same order of magnitude as the rubber globules of latex.

17. That product resulting from dissolving the coagulum of a latex in a solvent together with a dispersing agent, mixing water therewith, and subjecting the mixture to distillation for the removal of solvent, all without the application of heat sufficient to cause "depolymerization," said product being capable of dilution with water and of having the rubber in colloidial form and capable of being coagulated by heat or by a coagulating agent, the major portion of said dispersed particles being substantially uniform in size and of the same order of magnitude as the rubber globules of latex.

18. A process of dispersing rubber in non-depolymerized form in water, which comprises incorporating a dispersing agent and water in a mass of rubber made viscous by an organic swelling agent, thereafter adding water to the mass with manipulation of the mass at atmospheric pressure to cause the dispersion of said rubber in a continuous water phase, and removing said organic swelling agent.

19. A proces of dispersing a rubber mass in water, which comprises dissolving the rubber in a solvent, mixing water containing a hydrophilic colloid into the solution, and removing the solvent from the dispersion.

20. A process of dispersing a rubber mass in water, which comprises dissolving the rubber in a solvent, mixing water and a hydrophilic colloid with the solution, and vacuum-distilling the solvent from the resulting dispersion.

21. A process of dispersing a rubber mass in water, which comprises dissolving the rubber in a solvent, mixing water and a hydrophilic colloid with the solution, and distilling the solvent from the resulting dispersion under a vacuum of about 18 to 28 inches of mercury.

In testimony whereof I have affixed my signature.

WILLIAM BEACH PRATT.